(12) United States Patent
Sadasivan et al.

(10) Patent No.: US 6,335,395 B1
(45) Date of Patent: Jan. 1, 2002

(54) METHOD OF PREPARING A STABLE COATING

(75) Inventors: Sridhar Sadasivan; Suresh Sunderrajan, both of Rochester; Michelle M. Oakland, Macedon; Patrick J. Whittaker, Webster; Elwood C. Samons, Holley; Craig T. Mollon, Batavia, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/451,809

(22) Filed: Dec. 1, 1999

(51) Int. Cl.$^7$ .................................................. C08J 3/34
(52) U.S. Cl. ........................ 524/445; 524/446; 524/447; 524/451; 524/492; 524/493; 524/497; 524/494; 524/551; 524/555; 524/556; 524/563; 524/557; 524/577; 524/575
(58) Field of Search ................................. 524/445, 446, 524/447, 451, 494, 492, 473, 497, 557, 556, 577, 575, 563, 551, 555

(56) References Cited

U.S. PATENT DOCUMENTS

| 4,256,493 A | * | 3/1981 | Yokoyama et al. | 106/22 |
|---|---|---|---|---|
| 4,926,190 A | * | 5/1990 | Laver | 346/1.1 |
| 5,073,448 A | * | 12/1991 | Vieira et al. | 428/331 |
| 5,766,398 A | * | 6/1998 | Cahill et al. | 156/240 |
| 6,001,482 A | * | 12/1999 | Anderson et al. | 428/409 |
| 6,110,601 A | * | 8/2000 | Shaw-Klein et al. | 428/522 |
| 6,140,412 A | * | 10/2000 | Saitoh et al. | 524/591 |
| 6,165,593 A | * | 12/2000 | Brault et al. | 428/195 |

FOREIGN PATENT DOCUMENTS

DE    195 34 327 A1    2/1996

* cited by examiner

Primary Examiner—Judy M. Reddick
(74) Attorney, Agent, or Firm—Harold E. Cole

(57) ABSTRACT

A process for making a stable coating comprising an inorganic, anionic pigment, an organic, anionic binder and an organic, cationic mordant comprising:

a) mixing the inorganic, anionic pigment with the organic, cationic mordant;

b) lowering the pH of the mixture to below about 4; and c) adding the organic, anionic binder to the mixture, thus providing a coating composition which has an approximately constant viscosity over a period of time.

12 Claims, No Drawings

METHOD OF PREPARING A STABLE COATING

FIELD OF THE INVENTION

This invention relates to a method of preparation of a stable coating for a pigment-coated ink jet recording element.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-forming layer, and includes those intended for reflection viewing, which have an opaque support, and those intended for viewing by transmitted light, which have a transparent support.

While a wide variety of different types of image-recording elements for use with ink jet devices have been proposed heretofore, there are many unsolved problems in the art and many deficiencies in the known products which have limited their commercial usefulness.

It is well known that in order to achieve and maintain photographic-quality images on such an image-recording element, an ink jet recording element must:

- Be readily wetted so there is no puddling, i.e., coalescence of adjacent ink dots, which leads to nonuniform density
- Exhibit no image bleeding
- Exhibit the ability to absorb high concentrations of ink and dry quickly to avoid elements blocking together when stacked against subsequent prints or other surfaces
- Exhibit no discontinuities or defects due to interactions between the support and/or layer(s), such as cracking, repellencies, comb lines and the like
- Not allow unabsorbed dyes to aggregate at the free surface causing dye crystallization, which results in bloom or bronzing effects in the imaged areas
- Have an optimized image fastness to avoid fade from contact with water or radiation by daylight, tungsten light, or fluorescent light An ink jet recording element that simultaneously provides an almost instantaneous ink dry time and good image quality is desirable. However, given the wide range of ink compositions and ink volumes that a recording element needs to accommodate, these requirements of ink jet recording media are difficult to achieve simultaneously.

Ink jet recording elements are known that employ porous or non-porous single layer or multilayer coatings that act as suitable image receiving layers on one or both sides of a porous or non-porous support. Recording elements that use non-porous coatings typically have good image quality but exhibit poor ink dry time. Recording elements that use porous coatings typically have poorer image quality but exhibit superior dry times.

Simultaneous quick dry time and good image quality may be obtained by improving image quality of recording elements using porous coatings. The quality of images printed using ink jet printers on porous coatings is usually poor because ink jet ink dyes, upon application, tend to migrate through the pores away from the surface of the recording element resulting in poor image quality. In order to obtain good image quality and high optical density, it is necessary to maintain the ink dyes at or near the surface of the recording element. This may be achieved through the use of a component in the coating that will trap the dye molecule at or near the surface of the recording element. Since most ink jet ink dyes are anionic, a suitable cationic material may be used to trap the dye molecules at or near the surface of the recording element. Such a material is referred to in the art as a mordant.

Porous coatings are created by applying a coating containing inorganic anionic pigments, organic anionic binders, and anionic or non-ionic additives onto a substrate such as paper. Since such coatings are predominantly anionic, addition of a cationic mordant increases the viscosity to the point that the coating is no longer coatable using standard techniques.

German Patent DE 19,534,327A1 relates to an ink jet coating comprising an inorganic, modified cationic pigment and an organic, cationic binder. The patent discloses a cationic dispersion with pH in the range 5 to 12. There is a problem with this coating, however, in that it requires the use of cationic binders, instead of anionic binders which are more readily available.

It is an object of this invention to provide a process for making a stable coating containing a cationic mordant, an anionic pigment and anionic binder while maintaining a constant viscosity so that it can be coated using standard techniques.

SUMMARY OF THE INVENTION

This and other objects are achieved using the present invention which comprises a process for making a stable coating comprising an inorganic, anionic pigment, an organic, anionic binder and an organic, cationic mordant comprising:

a) mixing the inorganic, anionic pigment with the organic, cationic mordant;

b) lowering the pH of the mixture to below about 4; and c) adding the organic, anionic binder to the mixture, thus providing a coating composition which has an approximately constant viscosity over a period of time.

The ink jet recording elements made from the coating of the invention provide good image quality and fast ink dry times.

DETAILED DESCRIPTION OF THE INVENTION

As noted above, cationic mordants may be used to trap dyes at or near the surface of a recording element to improve image quality. However, the addition of a cationic mordant to a predominantly anionic coating results in the aggregation of oppositely charged particles, which in turn results in a rapid increase in coating viscosity to the point that the coating is no longer coatable using standard techniques.

During the coating preparation, it is important that the mordant retain its cationic charge to preserve its function to trap the anionic ink jet dyes. By lowering the coating pH, such as by using nitric acid, the anionic charge on the pigment and binder can be significantly reduced while maintaining the cationic charge on the mordant. Thus, the cationic mordant interacts less with the weakly anionic pigment and binder, thereby rendering the coating capable of being coated using standard coating techniques.

In a preferred embodiment of the invention, the pH is lowered to a range from 2–4, preferably approximately 3.

The inorganic, anionic pigment useful in the invention may be a kaolin clay, a calcined clay, titanium dioxide, talc or a silicate. In a preferred embodiment of the invention, the inorganic, anionic pigment is a kaolin clay sold under the trade name Hydragloss® 92 (J.M.Huber Company). The amount of inorganic, anionic pigment used may range from about 10% to about 50% of the coating, preferably from about 15% to about 30%.

The organic, anionic binder useful in the invention may be a styrene acrylic latex, a styrene butadiene latex, a poly (vinyl alcohol) or a poly(vinyl acetate). A commercially-available styrene acrylic latex useful in the invention is Acronal® S-728 (BASF Corp.). A commercially-available styrene butadiene latex useful in the invention is Styronal® BN 4606X (BASF Corp.). A commercially-available poly (vinyl alcohol) useful in the invention is Airvol® 21-205 (Air Products Inc.). A commercially-available poly(vinyl acetate) useful in the invention is Vinac® 884 (Air Products Inc.).

The organic, anionic binder may be used in an amount of from about 1% to about 10% of the coating, preferably from about 2% to about 4% of the coating. In general, good results are obtained when the ratio of pigment to binder is from about 3:1 to about 8:1.

The organic, cationic mordant useful in the invention may be a polymer latex dispersion or a water-soluble polymer solution. Examples of mordants useful in the invention are disclosed in U.S. Pat No. 5,474,843. Other useful mordants include cationic urethane dispersions sold under the trade name Witcobond® W-213 and Witcobond® W-215 (Witco Corporation).

In a preferred embodiment of the invention, the organic, cationic mordant is:

M1: poly(N-vinyl benzyl-N-benzyl-N,N-dimethyl ammonium chloride-co-styrene-co-divinyl benzene), M2: poly(N-vinylbenzyl-N,N,N-trimethylammonium chloride-co-ethylene glycol dimethacrylate), or M3: poly(N-vinylbenzyl-N,N,N-trimethylammonium chloride-co-divinyl benzene).

In general, good results have been obtained when the mordant polymer is present in an amount of from about 2% to about 20% of the coating, preferably from about 5% to about 10%.

Smaller quantities of up to about 2% of other binders may also be used such as poly(vinyl pyrrolidone) sold as Luviskol® VA 64W (BASF Corp.) or poly(vinyl pyrrolidone-co-vinyl acetate) sold as Luviquat® PQ11PN (BASF Corp.). In addition to the above major components, other additives such as pH-modifiers like nitric acid, cross-linkers, rheology modifiers, surfactants, UV absorbers, biocides, lubricants, dyes, optical brighteners etc. may be added as needed.

The substrate on which the coating made by the process of the invention may be porous such as paper or non-porous such as cellulose acetate or polyester films. The surface of the substrate may be treated in order to improve the adhesion of the image-receiving layer to the support. For example, the surface may be corona discharge treated prior to applying the image-receiving layer to the support. Alternatively, an under-coating or subbing layer, such as a layer formed from a halogenated phenol or a partially hydrolyzed vinyl chloride-vinyl acetate copolymer can be applied to the surface of the support.

The coating made by the process of the invention may be applied to one or both substrate surfaces through conventional pre-metered or post-metered coating methods such as blade, air knife, rod, roll coating, etc. The choice of coating process would be determined from the economics of the operation and in turn, would determine the coating specifications such as coating solids, coating viscosity, and coating speed. In a preferred embodiment, the coating would have a solids of 30 to 60%, low shear (100 rpm Brookfield) viscosity of 500–2000 centipoise.

The coating made by the process of the invention may be applied to a support to obtain a dry thickness ranging from about 5 to about 60 $\mu$m, preferably from about 20 to about 40 $\mu$m. The coating thickness required is determined through the need for the coating to act as a sump for absorption of ink solvent and the need to hold the ink near the coating surface. The coating may be applied in a single layer or in multiple layers so the functionality of each coating layer may be specified; for example, a two-layer structure can be created wherein the base coat functions as a sump for absorption of ink solvent while the top coat holds the ink.

After coating, the inkjet recording element obtained from the coating made by the process of the invention may be subject to calendering or supercalendering to enhance surface smoothness. The ink jet recording element may also be subjected to hot, soft-nip calendering at a temperature of about 65° C. and pressure of 14000 kg/m at a speed of from about 0.15 m/s to about 0.3 m/s.

The substrate on which the coating made by the process of the invention is applied may be opaque, translucent, or transparent. There may be used, for example, plain papers, resin-coated papers, various plastics including a polyester resin such as poly(ethylene terephthalate), poly(ethylene naphthalate) and poly(ester diacetate), a polycarbonate resin, a fluorine resin such as poly(tetra-fluoro ethylene), metal foil, various glass materials, and the like. The thickness of the substrate employed in the invention can be from about 12 to about 500 $\mu$m preferably from about 75 to about 300 $\mu$m.

Ink jet inks used to image the recording elements obtained from the coating made by the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements described herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The following examples further illustrate the invention.

EXAMPLES

Example 1

Dispersion D-1

A dispersion was prepared by mixing 4.5 g of Kaolin clay (Hydrogloss® 92, Huber Corp.) to 95 g of distilled deionized water. The dispersion was mixed using a Cowles® mixer at medium speed for 10 minutes. Then 0.9 g of a 50% solids dispersion of styrene acrylic latex (Acronal® S728, BASF Corp.) was added with further mixing for 5 minutes.

Dispersion D-2

A dispersion was prepared by mixing 200 g of a 15% solids dispersion of Mordant M3 with 100 g of distilled, deionized water.

Surface Charge Measurement

The anionic charge (in mPa-m/V) of D-1 and the cationic charge (in mPa-m/V) of D-2 were measured using electrokinetic sonic amplitude (ESA) techniques as described by R. T. Klingbiel et al. in "Electrokinetic Sonic Amplitude of Colloidal poly(Methyl Methacrylate) and Ludox® -TM", *Colloids and Surfaces,* 68(1992), 103. Then 1N nitric acid was added to adjust the pH to a determined value as shown in the following Table 1. The surface charge was then measured. This process was repeated various times as shown in the table. The following results were obtained:

TABLE 1

| D-1 | | D-2 | |
|---|---|---|---|
| pH | Anionic charge (mPa-m/V) | pH | Cationic charge (mPa-m/V) |
| 2.06 | 0.056 | 2.4 | 0.055 |
| 2.86 | 0.108 | 2.6 | 0.058 |
| 3.21 | 0.115 | 3.0 | 0.063 |
| 3.49 | 0.202 | 6.0 | 0.060 |
| 4.06 | 0.250 | 9.2 | 0.068 |
| 4.72 | 0.276 | 9.5 | 0.069 |
| 5.42 | 0.279 | 10.0 | 0.069 |
| 6.43 | 0.310 | — | — |

The results show that as the pH is reduced, the surface charge of D-1 is reduced and the surface charge of D-2 remains approximately constant.

D-1 is predominantly anionic while D-2 is cationic. If these two dispersions were mixed at a high pH, the viscosity of the coating would become too high to be coated because of the aggregation of the oppositely charged materials. By lowering the pH of the mixture of D-1 and D-2 using nitric acid, the coating is capable of being coated using standard coating techniques since the viscosity doesn't increase.

Example 2

Control 1

A coating was prepared by adding 100 g of Kaolin clay (Hydrogloss® 92, Huber Corp.) to 200 g of a 15% solids dispersion of Mordant M3. The dispersion was mixed using a Cowles® mixer at medium speed for 15 minutes. Then, 20 g of a 50% solids solution of poly(vinyl pyrrolidone) (Luviskol® 64W, BASF Corp.) was added with further mixing for 5 minutes. Then, 113 g of distilled deionized water was added with further mixing for 5 minutes. Then, 20 g of a 50 % solids dispersion of styrene acrylic latex (Acronal® S728, BASF Corp.) was added with further mixing for 5 minutes.

Coating 1 of the Invention

This coating was the same as Control 1 except that 15 g of IN nitric acid were added before the addition of the poly(vinyl pyrrolidone).

Viscosity Tests

The percent solids of the above coatings, pH and Brookfield viscosity at 100 rpm and Hercules high shear viscosity were measured. The following results were obtained.

TABLE 2

| Tests | Control 1 | Coating 1 |
|---|---|---|
| pH | 6.2 | 3.9 |
| percent solids | 33.2 | 31.8 |
| Brookfield 100 rpm viscosity (cP) | 1032 | 980 |
| high shear viscosity (cP) | 15.5 | 15.9 |

The stability of the coatings were monitored by measuring the viscosity as a function of time. The following results were obtained.

TABLE 3

| Time | Brookfield 100 rpm viscosity | | High shear viscosity | |
|---|---|---|---|---|
| (min) | Control 1 | Coating 1 | Control 1 | Coating 1 |
| 0 | 1032 | 980 | 15.5 | 15.9 |
| 30 | 1260 | 930 | 16.8 | 16.1 |
| 60 | 1340 | 950 | 18.1 | 16.8 |
| 90 | 1600 | 980 | 25.4 | 17.2 |

The above results show that the viscosity of the Coating 1 of the invention essentially did not change with time while Control 1 showed increasing viscosity over time. Thus, Coating 1 could be coated over an extended period of time without having the viscosity increase.

This invention has been described with particular reference to preferred embodiments thereof but it will be understood that modifications can be made within the spirit and scope of the invention.

What is claimed is:

1. A process for making a stable coating comprising an inorganic, anionic pigment, an organic, anionic binder and an organic, cationic mordant comprising the following steps in order:
   a) mixing said inorganic, anionic pigment with said organic, cationic mordant;
   b) lowering the pH of the mixture to below about 4; and
   c) adding said organic, anionic binder to said mixture, thus providing a coating composition which has a stable viscosity over a period of time;
   said inorganic, anionic pigment being present in the composition from about 10 to about 50 weight % of the coating;
   said organic, anionic binder being present in the composition from about 1 to about 10 weight % of the coating; and
   said organic, cationic mordant being present in the composition from about 2 to about 20 weight % of the coating.

2. The process of claim 1 wherein said inorganic, anionic pigment is a kaolin clay, a calcined clay, titanium dioxide, talc or a silicate.

3. The process of claim 1 wherein said inorganic, anionic pigment is a kaolin clay.

4. The process of claim 1 wherein said inorganic, anionic pigment is present in the composition from about 15 weight % to about 25 weight % of the coating.

5. The process of claim 1 wherein said organic, anionic binder is a styrene-acrylic latex, a styrene-butadiene latex, a poly(vinyl alcohol), or a poly(vinyl acetate).

6. The process of claim 1 wherein said organic, anionic binder is a styrene-acrylic latex.

7. The process of claim 1 wherein said organic, anionic binder is present in the composition from about 2 weight % to about 3 weight % of the coating.

8. The process of claim 1 wherein said organic, cationic mordant is poly(N-vinyl benzyl-N-benzyl-N,N-dimethyl ammonium chloride-co-styrene-co-divinyl benzene); poly(N-vinylbenzyl-N,N,N-trimethylammonium chloride-co-ethylene glycol dimethacrylate); or poly(N-vinylbenzyl-N,N,N-trimethylammonium chloride-co-divinyl benzene).

9. The process of claim 1 wherein said organic, cationic mordant is poly(N-vinylbenzyl-N,N,N-trimethylammonium chloride-co-divinyl benzene).

10. The process of claim 1 wherein said organic, cationic mordant is present in the composition from about 5 weight % to about 10 weight % of the coating.

11. The process of claim 1 wherein said pH is lowered to a range from 2–4.

12. The process of claim 11 wherein said pH is lowered to approximately 3.

\* \* \* \* \*